United States Patent
Koch et al.

(10) Patent No.: US 10,177,961 B2
(45) Date of Patent: Jan. 8, 2019

(54) METHOD AND DEVICE FOR AUTOMATIC ADDRESSING AND RECOGNITION OF SPATIAL PROXIMITY RELATIONSHIPS IN MODULAR SYSTEMS FOR TRANSFERRING OBJECTS

(71) Applicant: BDT Media Automation GmbH, Rottweil (DE)

(72) Inventors: Danny Koch, Rottweil (DE); Ulrich Adrion, Trossingen (DE); Martin Kuner, Donaueschingen (DE); Franz Bucher, Villingen-Schwenningen (DE)

(73) Assignee: BDT MEDIA AUTOMATION GMBH, Rottweil (DE)

(*) Notice: Subject to any disclaimer, the term of this patent is extended or adjusted under 35 U.S.C. 154(b) by 767 days.

(21) Appl. No.: 14/133,784

(22) Filed: Dec. 19, 2013

(65) Prior Publication Data
US 2014/0188262 A1 Jul. 3, 2014

(30) Foreign Application Priority Data

Dec. 21, 2012 (DE) ......................... 10 2012 112 974

(51) Int. Cl.
*H04L 29/12* (2006.01)
*H04B 5/00* (2006.01)
(Continued)

(52) U.S. Cl.
CPC ...... *H04L 29/12207* (2013.01); *G01S 5/0289* (2013.01); *G05B 19/4185* (2013.01); *G06F 13/409* (2013.01); *G11B 15/689* (2013.01);

*G11B 17/228* (2013.01); *H04B 5/0031* (2013.01); *H04L 41/0803* (2013.01);
(Continued)

(58) Field of Classification Search
CPC . G01S 5/0289; G05B 19/4185; G11B 15/689; G11B 17/228; H04L 29/12207; H04L 41/0803; H04L 61/20; H04W 4/80; H04B 5/0031; H04Q 1/15; G06F 13/409
See application file for complete search history.

(56) References Cited

U.S. PATENT DOCUMENTS 5,346,079 A * 9/1994 Price, Jr. .............. A47B 49/004
211/131.1
5,999,295 A * 12/1999 Vowell ................. H04B 10/801
385/92

(Continued)

*Primary Examiner* — Crystal J Barnes-Bullock
(74) *Attorney, Agent, or Firm* — Leydig, Voit & Mayer, Ltd.

(57) ABSTRACT

A method for the recognition of spatial proximity relationships in a modular system having module assemblies, each module assembly having a transmitter and a receiver arranged so that the transmitter of a first module assembly corresponds to the receiver of a second module assembly, and each of the module assemblies having a network connection for connection via a communication network to other of the module assemblies, includes: automatically requesting and allocating a network address for each of the respective network connections via the communication network so as to enable an addressing of the module assemblies via the network; and determining spatial proximity relationships of the module assemblies by triggering and evaluating the transmitters and receivers using the communication network via the network connection.

15 Claims, 5 Drawing Sheets

(51) Int. Cl.
*H04Q 1/02* (2006.01)
*H04L 12/24* (2006.01)
*H04W 4/80* (2018.01)
*G06F 13/40* (2006.01)
*G01S 5/02* (2010.01)
*G11B 15/68* (2006.01)
*G11B 17/22* (2006.01)
*G05B 19/418* (2006.01)

(52) U.S. Cl.
CPC ............... *H04L 61/20* (2013.01); *H04Q 1/15* (2013.01); *H04W 4/80* (2018.02)

(56) References Cited

U.S. PATENT DOCUMENTS

| | | | |
|---|---|---|---|
| 6,269,411 B1 | 7/2001 | Reasoner | |
| 6,509,992 B1* | 1/2003 | Goodwill | H04B 10/1141 398/129 |
| 6,930,854 B2 | 8/2005 | Taki | |
| 7,568,015 B2* | 7/2009 | Wang | H04L 29/12207 709/220 |
| 8,281,030 B2* | 10/2012 | Wang | H04L 67/02 709/203 |
| 8,610,310 B2* | 12/2013 | Lockett | H04R 3/00 307/104 |
| 2007/0053695 A1* | 3/2007 | Margaritis | H04B 10/1127 398/131 |
| 2013/0028152 A1* | 1/2013 | Kim | H04W 88/08 370/310 |
| 2013/0107853 A1* | 5/2013 | Pettus | H04W 84/10 370/330 |
| 2014/0078686 A1* | 3/2014 | Lockett | H04N 7/163 361/735 |
| 2014/0112485 A1* | 4/2014 | Lockett | H04N 7/163 381/59 |
| 2014/0233460 A1* | 8/2014 | Pettus | H04Q 1/15 370/328 |

\* cited by examiner

METHOD AND DEVICE FOR AUTOMATIC ADDRESSING AND RECOGNITION OF SPATIAL PROXIMITY RELATIONSHIPS IN MODULAR SYSTEMS FOR TRANSFERRING OBJECTS

CROSS-REFERENCE TO RELATED APPLICATIONS

Priority is claimed to German Patent Application No. DE 10 2012 112 974.6, filed on Dec. 21, 2012, the entire disclosure of which is hereby incorporated by reference herein.

FIELD

The invention relates to a method and a device for the automatic addressing and recognition of spatial proximity relationships in modular systems for transferring objects beyond the module boundaries.

BACKGROUND

Modular systems for transferring objects beyond the module boundaries are found inter alia in production lines involving transferring objects, e.g. print, paper and packaging processing machines, stackable devices of data carriers, as well as production lines for the production, separation and cleaning of semiconductors and many other areas. Such systems are as a rule mechanically connected in order to ensure the alignment of the modules with respect to one another and are furthermore logically addressed in order to be able to create a unique allocation, which inter alia is necessary in order to produce an ordered communication of the respective modules with one another. Coded plugs or switches, circuits or special addressing protocols are used for example for the logic addressing. As a rule it is necessary to match the logic arrangement with the physical arrangement, so as to be able to ensure a clear system allocation.

From U.S. Pat. No. 6,930,854 B2 a stackable tape storage library is known, which mechanically connects the modules firmly to one another. The logic allocation and addressing of the modules is performed via an algorithm, in which first of all the number of subscribers in the system is determined by a serial point-to-point data connection (RS232), whereupon based on the start point of a base unit a transporter is moved from one unit to the next, wherein sensors monitor the arrival at reference points and accordingly assign a logic module address.

U.S. Pat. No. 6,269,411 B1 describes a stackable tape storage library, which effects the automatic address assignment via a serial protocol in conjunction with a circuit for the unique address assignment, wherein a mechanical connection can be dispensed with but an electrical connection of each module to the respective direct successor is essential.

U.S. Pat. No. 6,269,411 B1 describes a system for automatic addressing with the aid of a separate circuit, which numbers in descending order the successive stackable devices for the storage of data carriers corresponding to the arrangement. However, for this purpose use is not made of the otherwise employed communication channel; instead, a further electrical connection between the units is essential, which connects each module to the respective direct successor and in turn involves increased component demand and installation expenditure. Furthermore in this case there is no possibility at all of aligning the modules with respect to one another. The circuit would neither recognise whether a module had been taken from the system nor whether it deviates only slightly in its orientation, which means therefore that the transporter driving through the modules is confronted by an insurmountable hurdle.

SUMMARY OF THE INVENTION

In an embodiment, the present invention provides a method for the recognition of spatial proximity relationships in a modular system having module assemblies wherein each module assembly includes a transmitter and a receiver arranged so that with a correct alignment of the module assemblies the transmitter of a first of the module assemblies corresponds to the receiver of a second of the module assemblies, and wherein each of the module assemblies includes a network connection for connection via a communication network to other of the module assemblies. The method includes the steps: automatically requesting and allocating a network address for each of the respective network connections via the communication network through the respective module assembly so as to enable an addressing of the module assemblies via the network; and determining spatial proximity relationships of the module assemblies by triggering and evaluating the transmitters and receivers using the communication network via the network connection.

determining spatial proximity relationships of the module assemblies by triggering and evaluating the transmitters and receivers using the communication network via the network connection.

BRIEF DESCRIPTION OF THE DRAWINGS

The invention is explained in more detail hereinafter with the accompanying drawing, in which.

In the figures the same reference numerals denote identical or functionally equivalent parts, wherein for a better understanding not all reference numerals are given in all the figures.

DETAILED DESCRIPTION

Mechanical connections of modular systems for transferring objects beyond the module boundaries always involve increased installation expenditure. The proposed invention can dispense with physical connections of a mechanical nature as well as electrical connections, since the data channel can also be created via wireless connections and the optical transmitter/receiver system is suitable for just this mechanically connection-free solution.

In an embodiment, the invention provides a modular system that is designed to effect the transfer of objects beyond the module boundaries and which may vary in its modular composition, an inexpensive but nevertheless reliable solution for recognising all modules of the system, to clarify the spatial proximity relationships, to ensure the correct alignment of the modules with respect to one another, and to provide a communication channel without necessarily requiring a mechanical connection of the modules, in order thereby to keep the installation expenditure low. In addition it should be possible to determine during the operation whether individual modules have been taken from the system arrangement, or have been restored to the system arrangement after a temporary absence.

In particular the invention involves a method for recognising spatial proximity relationships in a modular system, comprising module assemblies (M1, ... Mn), wherein each module assembly has at least one transmitter (S) and at least one receiver (R), which are arranged so that with the correct alignment of the module assemblies a transmitter (S) of a first module assembly corresponds to a receiver (R) of a second module assembly. In this connection each module assembly comprises in addition to the transmitter and receiver a network connection, in order to establish via the network a communication connection between the module assemblies. A communication with which the transmitters and receivers can be controlled and read is made via this network. Thus, on the basis of these three components, namely transmitter, receiver and network connection, a recognition of the communication can be achieved. In a preferred embodiment the accuracy of the allocation can also be checked, wherein a deviation from the optimal alignment leads to a corresponding response in the signal and/or in the receiver. The transmitter and receiver are thus basically needed so that the alignment of the module assemblies is established. The transmitter and the receiver are in the preferred embodiment triggered by a control unit within the module assembly. The control unit furthermore includes the network connection, via which the communication network effects an exchange of information with the further module assemblies. Via this network connection the module assembly receives requests and commands and transmits back corresponding replies. Furthermore the module assemblies are connected to one another via a communication network. In the preferred embodiment there is a master module assembly, which can be switched on beforehand for example by a corresponding switch, or which is differentiated on account of a configuration change from the further module assemblies, the other assemblies responding to commands of the master module assembly. In a preferred embodiment there may also be redundant master assemblies or a unit that is arranged outside the module assemblies, in order to define and control the spatial arrangement.

The method comprises the following steps:

Automatic request and allocation of a network address via the communication network through each module assembly, so that this can be addressed via the network. This step is as a rule performed at the start, when an initialisation or a switching on of the module assembly takes place.

Due to the request for the communication address, which is communicated for example via DHCP, the module assembly is also registered at a DHCP and is thus known and can also be addressed in the network. However, the position of the module assembly within the array is not known through this address, but simply the existence within the network.

Determination of the spatial proximity relationships by triggering and evaluating the transmitters (S) and receivers (R) via the communication network.

In this step a triggering of the transmitters and receivers of all module assemblies of the network is performed via the communication network and the address determined in the first step, in a form that indicates exactly where the module assemblies are spatially located. As a rule this is performed by chronologic switching and interrogation of different transmitters and receivers, wherein the already localised module assembly is successively switched off in order to interrogate the remaining module assemblies and determined their position. In this way the number of module assemblies in each interactive step is reduced, so that at the end one module assembly is still left, whose position is logically at the end. Further details are given in the following description.

In one embodiment the module assemblies are also arranged spaced from one another. In other words, a direct contact is not required. This arrangement depends however also on the type of transmitter and receiver. In optical systems, in which the receiver is an optical transmitter/receiver system, a sufficient interspacing can be specified. If on the other hand mechanical systems are used, then this is only limitedly possible.

In an alternative arrangement the module assemblies can spatially adjoin one another and have contact surfaces.

The communication network can be one or more of the following: a wireless connection, in particular a Wlan connection; Bluetooth; Zigbee; NFC or an IR connection, or also a wired connection, in particular Ethernet, serial connection, CAN etc.

In a preferred embodiment the network is an IP (TCP/IP) network, together with the corresponding services and communication forms.

In a preferred implementation the transmitter (S) and receiver (R) are furthermore also switched on during the operation and after the initialisation, and if a change of status occurs a notification is then transmitted via the communication network, so that the removal and/or the insertion of module assemblies are recognised during the operation. It can thereby be ensured that no modules are removed unnoticed during the operation. This is particularly important for controlling the transfer of an object from one module to the next, in order to be able to determine beforehand whether the transfer can take place at all, without damaging the object or causing an error.

In a preferred embodiment a module assembly comprises a control unit, which can also be termed master, which has access to the DHCP server/service or provides this itself and controls the other module assemblies and evaluates the results, so as to assign the spatial addresses. This control unit can be a computer system (e.g. Linux) on a small motherboard, which readies the DHCP server, and which after receiving a DHCP enquiry and providing a DHCP address determines the spatial arrangement, the transmitter and receiver being controlled and evaluated in a specific chronologic pattern by transmission of commands via the communication network. In this connection preferably the following steps are carried out:

a) Initial request to all module assemblies via the communication network to switch on their transmitters (S) and monitor the receivers (R),
b) Receiving the status notifications with regard to the receivers (R) of the individual module assemblies via the communication network,
c) Allocation of the spatial start address to the module assembly that receives no signal via the receiver (R),
d) Request to switch off all transmitters, and to select and request the last spatially addressed module assembly to switch on its transmitter via the communication network,
e) Reception of the status notifications of the individual module assemblies via the communication network,
f) Allocation of the spatial proximity address to the receiver of a signal of the transmitter,
g) Repeated execution of the steps d), e), f) until all module assemblies that have received an address via the communication network have been spatially allocated.

A further part of the invention provides a device that is appropriately designed so as to implement the aforementioned method.

The invention has in particular advantages in cases where systems can also be changed subsequently as regards their composition, for example on account of an additional production step that may be introduced via an additional module at an arbitrary place in an already existing system, or individual modules temporarily have to be removed during operation, since the presence as well as the correct alignment of the module in the system can be checked.

Figure 1:
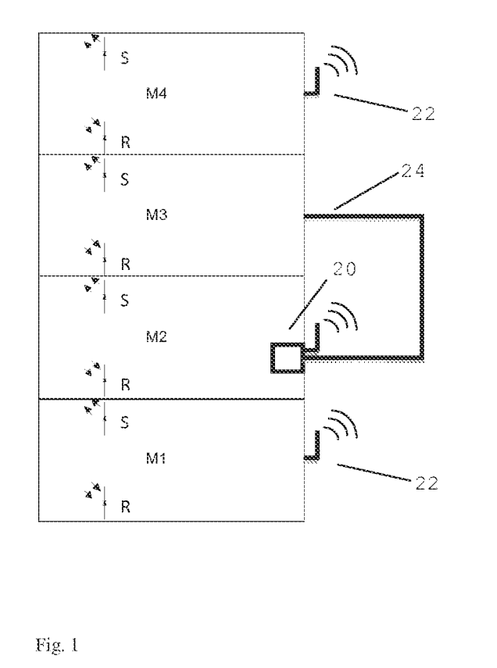
FIG. 1 shows a basic representation of a system of vertically stacked modules including the transmitter and receiver units for the spatial allocation and alignment, as well as an exemplary representation of the communication channel.

FIG. 1 shows a schematic representation of a modular system of modules (M), aligned vertically with respect to one another, consisting of the modules M1, M2, M3 and M4.

The data channel for the communication is in this connection provided via a local network, which could correspond to the IEEE 802.11 Standard and which, as illustrated in FIG. 1, can implement the physical connection with the aid of transmitting/receiving antennae of a wireless communication channel (22). It is however completely practicable to use, instead of the illustrated transmitting/receiving antennae of a wireless communication channel (22), a line-connected communication connection (24) like the Standard IEEE 802.3, which is largely compatible with IEEE 802.11. This has advantages particularly in cases where high demands are placed on data throughputs and data stability. Also the line-connected variant has advantages compared to the prior art as regards the installation expenditure, since on such networks no order as regards the slots has to be maintained and therefore no existing connections have to be rewired.

The controller for the automatic address allocation of the communication channel (20), which has access to a dynamic address assignment protocol, such as for example DHCP, ensures the logic uniqueness of the addressing for the communication via the data channel.

Figure 2:
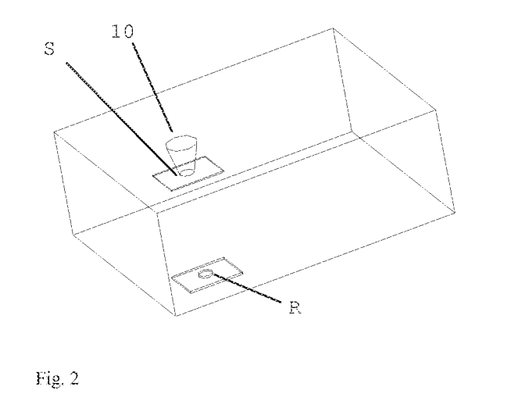
FIG. 2 is an isometric representation of a module for the vertical stacking arrangement including the transmitter and receiver units for the spatial allocation and alignment.

The optical receiver (R) of a module (M) is provided in order to receive the signal (10) of a neighbouring module (M) that is emitted by the transmitter (S), which broadens out in the form of an emitted light cone (10), shown by way of example in FIG. 2. This signal can then be used again in order to confirm the presence and/or the correct alignment of a neighbouring module $M_{n-1}$ relative to the module $M_n$ of the receiver (R).

Figure 3:
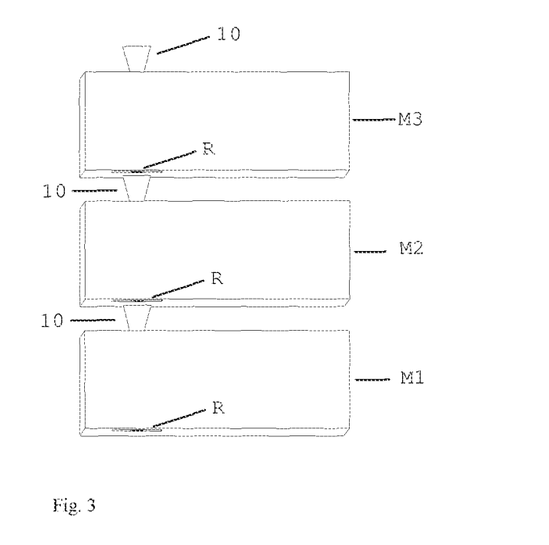
FIG. 3 is an isometric representation of a system of vertically stacked modules including the transmitter and receiver unit for the spatial allocation and alignment.

FIG. 3 shows a system of vertically stacked modules (M), which are arranged spaced from one another, in order to show by way of example that the interspacing in which signals are evaluated as allowable is simply a question of the adjustment of the sensitivity of the receiver (R) and the intensity of the emitted signal (10) of the transmitter (S). It has also been found however that, on account of the conical shape of the optical signal, the alignment of spaced-apart modules becomes more inaccurate with increasing interspacing, unless light sources that emit bundled light are used. For the sake of clarity the construction that could hold vertically stacked modules spaced apart was omitted. These could for example be pull-out rails, which are secured in frame constructions in order to provide a simple removal of the modules (M) from the system, in order for example to insert, exchange or reload media. As a specific example a stackable tape storage library could be mentioned here, in which each module (M) regarded per se is a tape storage library including the accommodation for the storage media and a device for data transfer from/to the storage media, but with the restriction that simply one transporter is available for all modules (M), which transports the storage media from the respective accommodation to the data transfer devices and vice versa. The media are now mounted on an assembly carrier in the form of a framework. The advantage of the proposed invention is that the individual modules (M) are connected by means of pull-out rails to the assembly carrier and during the operation of the whole system individual modules (M) can be removed from the system array for example for repair purposes, without having to interrupt the operation of the whole system. In this connection, when a module (M) is removed the adjacent module (M) would recognise, on account of the missing signal (10) at the receiver, that the system array is interrupted at this point. The operation of the system could thus be continued in the part of the system where the transporter is located, and specifically as far as the new system boundary that is specified by the withdrawn module (M).

Figure 4:
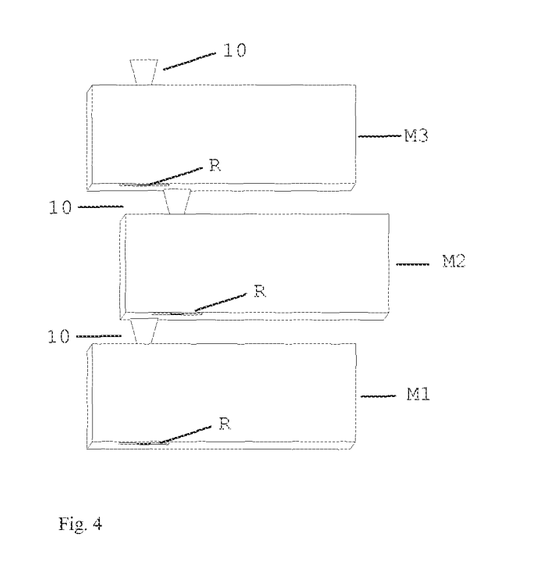
FIG. 4 is an isometric representation of a system of vertically stacked modules, in which the recognition of the misalignment of a module along a imaginary X axis will be explained with the aid of the transmitter and receiver unit.
Figure 9:
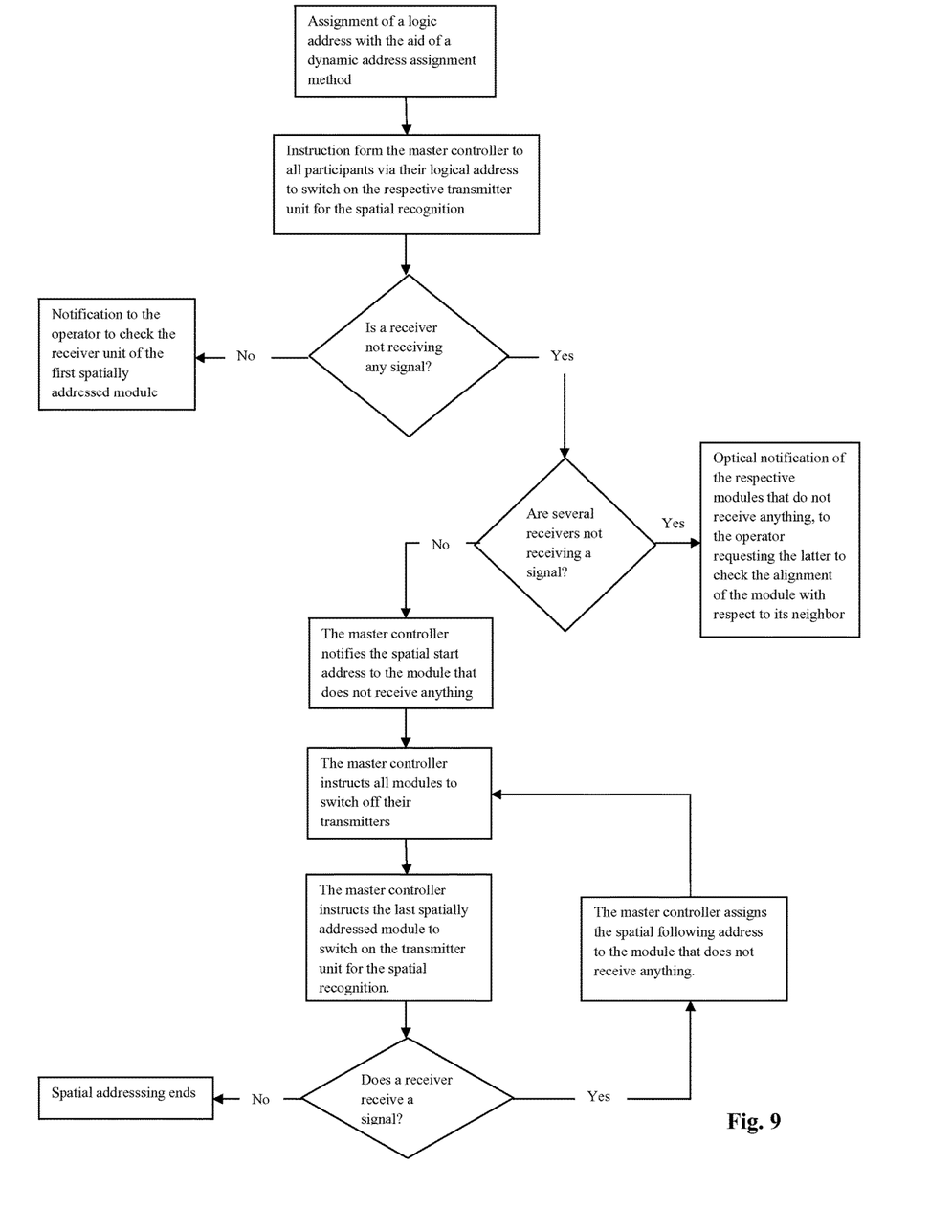
FIG. 9 is a flow diagram of the logic and spatial addressing as a result of the system start.

FIG. 4 shows a system of vertically stacked modules (M), which are misaligned with respect to one another along an imaginary X axis. During a system initialisation and an initial, logic and spatial addressing associated therewith, as illustrated in FIG. 9, no kind of proximity relationships would now be recognised on account of the missing signal at the receivers (R) of the modules M1, M2 and M3. Since however logic addresses for the communication channel have already been assigned to the modules (M), a system discrepancy would thereby be recognised and a notification could accordingly be issued, which would for example instruct a user of such a system to check the alignment of the modules (M) of the system with respect to one another.

The diagrams of FIG. 1, FIG. 2, FIG. 3 and FIG. 4 could represent for example a stackable tape storage library, in which each of these modules has access to a specific number of accommodation devices for data carriers, but also if necessary one or more devices for accommodating or reproducing the data. Such a system now has access to a transporter/picker, which drives through the corresponding modules of the system in order for example to transport the data carriers from the accommodating device to an accommodating device or reproducing/storage device.

The background to stackable automated tape storage libraries lies in the fact that first of all a basic configuration can be compiled and the system can afterwards be expanded, depending on additional storage requirements, by further modules with accommodating devices for data carriers as well as devices for accommodating/write and reproducing/read the data. Accordingly it must first of all be determined at the start of the system how many modules the system is composed of, so as to derive from this the proximity relationships. During the operation individual modules (M) of the system can be temporarily removed from the system order, in order for example to carry out repairs and exchange of components. This must however be recognised by the system, which can continue to operate during this time, as already described, though the system is restricted as in the access region.

Figure 5:
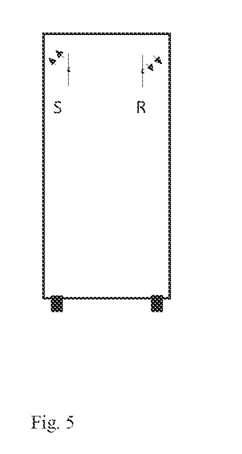
FIG. 5 is a basic representation of a module for the horizontal line-up to a system, including the transmitter and receiver units for the spatial allocation and alignment.

It will be shown with the aid of FIG. 5 that the device and the method for the automatic addressing and recognition of spatial proximity relationships is not restricted to vertically stackable modules (M) of a modular system. There are of course cases of application of modular systems in which the modules are lined up horizontally. If for example a machine for the further print processing is subdivided into modules (M) based the processes to be executed, then modules (M) are obtained in which one represents for example the individualisation process, another module (M) represents the cutting process, and a further module represents the binder, the alignment process, the lamination unit, the printing unit, or the collection and stacking unit, etc. Accordingly systems can be composed of virtually any arbitrary arrangements. It must however be ensured that the alignments of the individual modules (M) of the system agree with one another, since otherwise objects cannot be reliably transferred beyond the module boundary.

In order to ensure this, then as illustrated in FIG. 9 a logic address is firstly obtained from each module (M) of the system with the aid of a dynamic address assignment method, such as for example DHCP. Following this modules (M) that have obtained a logic address are identified as participating modules. Next a master system control unit or a control unit with enhanced capabilities notifies the participating modules (M) to switch on their respective transmitters (S) for the spatial recognition of the proximity relationships. Each participating module (M) then appropriately checks whether the receiver (R) of the respective module (M) receives a signal. The recognition of a signal of the respective modules (M) can now be suitably evaluated within the master system control unit. In the case where no receiver (R) receives a signal or several receivers (R) receive no signal, corresponding operator interactions can be initiated, with the aim of rectifying the defective behaviour. In the best case there is just one receiver (R) that does not receive a signal, whereby the corresponding module (M) can be defined as a spatial start point of the system. As a result of the recognition of the spatial start point of the system, the master system control unit allocates the spatial start address to the corresponding module (M).

Following the spatial address allocation the master system control unit, which can also be identified simply as master, informs all participating modules (M) to switch off the respective transmitters (S). Now the master system control unit (the master) notifies the respectively last spatially addressed module (M) to switch on its transmitter (S) and in turn asks all participating modules (M) whether a signal has been received, whereupon the spatial following address is then allocated. This procedure is continued, as shown in FIG. 9, until the switching on of the transmitter (S) of the last spatially addressed module (M) is no longer received by any further module (M). Other approaches and orders are also possible using the receiver and transmitter.

Within the context of the spatial recognition and fault handling cases are also detected in which, although the system generally consists of the respective modules (M), the correct alignment of the modules with respect to one another is not yet ensured.

Figure 6:
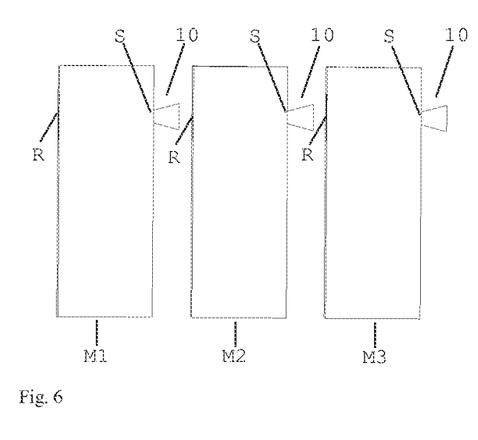
FIG. 6 is an isometric representation of a system of modules in a horizontal array, wherein the recognition of too large interspacing of the modules along an imaginary X axis will be explained with the aid of the transmitter and receiver unit.
Figure 7:
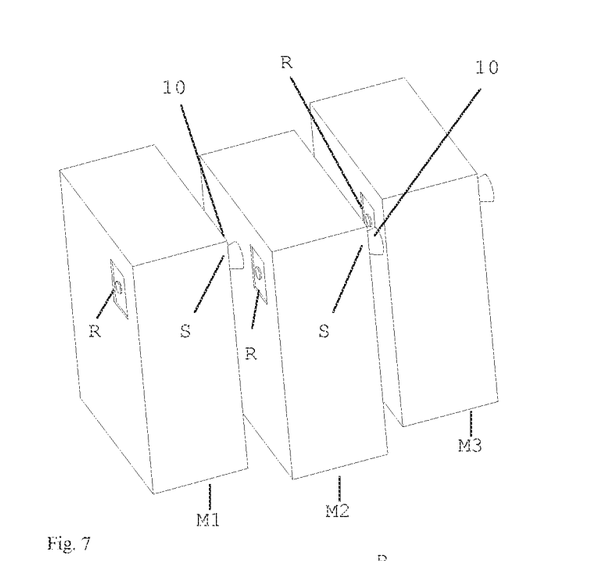
FIG. 7 is an isometric representation of a system of modules in a horizontal array, in which the recognition of a misalignment of a module along an imaginary Z axis will be explained with the aid of the transmitter and receiver unit.
Figure 8:
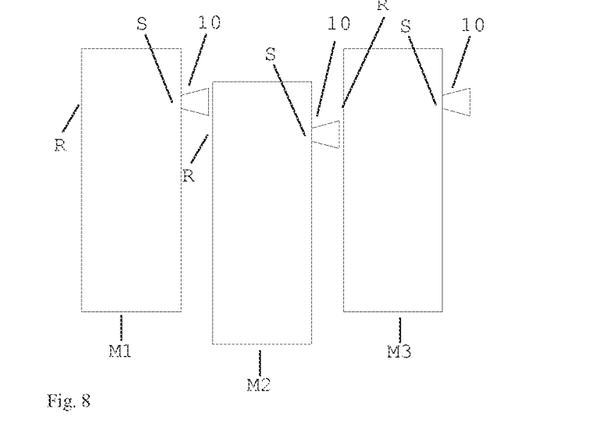
FIG. 8 is an isometric representation of a system of modules in a horizontal array, wherein the recognition of a misalignment of a module along an imaginary Y axis will be explained with the aid of the transmitter and receiver unit.

FIG. 6 shows by way of example a case in which the modules (M) of the system in the horizontal array have a too large mutual interspacing along an imaginary X axis. This can be established if the threshold value of the receiver (R) is not reached, in which connection it should be noted that, depending on the employed receiver (R), it may be possible to adapt the threshold value, whereby the necessary accuracy of the alignment of the modules (M) with respect to one another can be influenced. Similarly to this, a misalignment along an imaginary Z axis, as illustrated in FIG. 7, as well as a misalignment along an imaginary Y axis, as illustrated in FIG. 8, can also be established.

A particular advantage of the proposed method as regards the application in industrial plants is that the alignment of the modules with respect to one another can always be monitored during the operation. For this, all transmitters (S) simply have to be switched on also during operation. This may be useful in particular if large loads are moved within the industrial application, for example pallets with fork-lift trucks, and on account of carelessness in the movement of these loads individual modules may be displaced. With the proposed method it would be possible to recognise the discrepancy as regards the alignment on the basis of an altered signal level at the receiver (R), before a faulty behaviour in the object transfer and the accompanying possible damage to objects could arise.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

It should be noted that the method and the devices should not be limited only to the examples mentioned above.

Rather, the basic approach can be applied to all modular systems whose relative spatial arrangement with respect to one another is important.

LIST OF REFERENCE NUMERALS

10 Emitted light cone
20 Controller for the automatic address allocation of the communication signal
22 Transmitter/receiver antennae of a wireless communication channel
24 Lead-connected communication connection
M Module assembly
M1 Module assembly
M2 Module assembly
M3 Module assembly
M4 Module assembly
S Transmitter
R Receiver

What is claimed is:

1. A method for the recognition of spatial proximity relationships in a modular system having module assemblies, wherein each module assembly includes a transmitter and a receiver arranged so that with a correct alignment of the module assemblies the transmitter of a first of the module assemblies corresponds to the receiver of a second of the module assemblies and the transmitter of the second of the module assemblies corresponds to the receiver of a third of the module assemblies, and wherein each of the module assemblies includes a network connection for connection via a communication network to other of the module assemblies, the method comprising the steps:
   automatically requesting and allocating a network address for each of the respective network connections via the communication network through the respective module assembly so as to enable an addressing of the module assemblies via the network;
   determining spatial proximity relationships of the module assemblies by triggering and evaluating the transmitters and receivers using the communication network via the network connection; and
   checking the correct alignment of the module assemblies with respect to one another and providing a notification that at least one of the module assemblies is misaligned based on the receivers of at least two of the module assemblies not receiving a signal,
   wherein the module assemblies are stackable tape storage libraries, and
   wherein the method further comprises the steps:
   a) initial requesting to all module assemblies via the communication network to switch on their respective transmitters and monitor the receivers;
   b) receiving status notifications regarding the receivers of the module assemblies via the communication network;
   c) allocating a spatial start address to a module assembly that receives no signal via the receiver;
   d) requesting to switch off all transmitters, and selecting and requesting a last spatially addressed module assembly to switch on its respective transmitter via the communication network;
   e) receiving, the status notifications of the module assemblies via the communication network;
   f) allocating a spatial adjacent address to the receivers of a signal of a transmitter; and
   g) repeatedly executing steps d),e), and f) until all module assemblies that have received an address via the communication network have been spatially allocated.

2. The method according to claim 1, wherein the module assemblies are spaced from one another.

3. The method according to claim 1, wherein the module assemblies have spatially adjoining and contact surfaces.

4. A method according to claim 1, wherein the transmitter of the first module assembly and the receiver of the second module assembly form an optical transmitter/receiver system.

5. The method according to claim 1, wherein the communication network includes at least one of a wireless connection or a wire-connected connection.

6. The method according to claim 1, wherein during operation the transmitters and receivers are switched on, and further comprising the step, if a change in status occurs: transmitting a notification via the communication network so that the removal and/or the introduction of module assemblies during the operation can be recognised.

7. The method according to claim 1, wherein each module assembly obtains once after a starting, via DHCP via the communication network, an IP address for communication therethrough.

8. The method according to claim 1, wherein the control unit of at least one of the module assemblies is a master, which has access to a DHCP server/service, and is configured to control the other module assemblies and evaluate results in order to assign spatial addresses to the module assemblies.

9. A modular system comprising a plurality of module assemblies having spatial proximity relationships to be recognized, each module assembly comprising:
   a transmitter and a receiver arranged so that, with a correct alignment of the module assemblies, the transmitter of a first of the module assemblies corresponds to the receiver of a second of the module assemblies and the transmitter of the second of the module assemblies corresponds to the receiver of a third of the module assemblies;
   a network connection for connection via a communication network to other of the module assemblies; and
   a control unit configured to automatically request and allocate a network address for the network connection via the communication network so as to enable an addressing of the module assembly via the network, the control unit being configured to determine spatial proximity relationships of the module assemblies by triggering and evaluating the respective transmitters and receivers using the communication network via the network connection, the control unit being configured to check the correct alignment of the module assemblies with respect to one another and provide a notification that at least one of the module assemblies is misaligned based on the receivers of at least two of the module assemblies not receiving a signal,
   wherein the module assemblies are stackable ape storage libraries,
   wherein the control unit of at least one of the module assemblies is a master, which has access to a DHCP server/service, and is configured to control the other module assemblies and evaluate results in order to assign spatial addresses to the module assemblies, and
   wherein the master is configured to enable;

a) initial requesting to all module assemblies via the communication network to switch on their respective transmitters and monitor the receivers;
b) receiving status notifications regarding the receivers of the module assemblies via the communication network;
c) allocating a spatial start address to a module assembly that receives no signal via the receiver;
d) requesting to switch off all transmitters, and selecting and requesting a last spatially addressed module assembly to switch on its respective transmitter via the communication network;
e) receiving the status notifications of the module assemblies via the communication network;
f) allocating a spatial adjacent address to the receivers of a signal of a transmitter; and
g) repeatedly executing steps d), e), and f) until all module assemblies that have received an address via the communication network have been spatially allocated.

10. The modular system according to claim 9, wherein the module assemblies are spatially separated from one another.

11. The modular system according to claim 9, wherein the module assemblies spatially adjoin one another and have contact surfaces.

12. The modular system according to claim 9, wherein the transmitter of the first module assembly and the receiver of the second module assembly form an optical transmitter/receiver system.

13. The modular system according to claim 9, wherein the communication network includes at least one of a wireless connection and a wire-connected connection.

14. The modular system according to claim 9, wherein during operation the transmitter and receiver is switched on and is configured to, if a change in status occurs, transmit a notification via the communication network so that the removal and/or the introduction of a module assembly during the operation can be recognized.

15. The modular system according to claim 9, wherein the module assembly is configured to obtain once after a starting, via DHCP via the communication network, an IP address for communication therethrough.

* * * * *